Patented Sept. 18, 1945

2,384,947

UNITED STATES PATENT OFFICE 2,384,947

VINYLIDENE CHLORIDE COMPOSITIONS

Lorne A. Matheson, Midland, Mich., assignor to The Dow Chemical Company, Midland, Mich., a corporation of Michigan No Drawing. Application July 18, 1941, Serial No. 403,021

2 Claims. (Cl. 260—43)

This invention relates to thermoplastic compositions comprising polymeric vinylidene chloride products modified with phenol-formaldehyde resins.

As herein used, the term "polymeric vinylidene chloride product" includes the polymer of vinylidene chloride alone and other products, whether polymers, co-polymers, interpolymers, or otherwise named, which may be obtained by polymerizing together monomeric vinylidene chloride and one or more of the monomers of other polymerizable materials, such as vinyl chloride, vinyl acetate, vinyl ethers, acrylic and methacrylic acids and esters thereof, acrylic nitrile, butadiene, styrene, allyl chloride and the allyl, methallyl, crotonyl, 2-chloroallyl, or cinnamyl esters of mono and dicarboxylic acids. The polymer of vinylidene chloride alone is described in U. S. Patent No. 2,160,903 and many of its co-polymers with other polymerizable compounds, as well as certain plasticized compositions comprising these co-polymers, and ways in which the products may be made, are described in U. S. Patent 2,160,904; 2,206,022; 2,215,379; and 2,160,931 to 2,160,948, inclusive.

Phenolic resins are broadly the products obtained by the reaction, in the presence of a catalyst, of almost any phenolic body such as phenol, cresol, resorcinol, naphthol, etc., with almost any carbonyl compound such as formaldehyde, acetone, benzaldehyde, furfural or their reaction products with ammonia. More specifically phenol-aldehyde resins include the complexes resulting from the condensation of a phenol with an aldehyde, such as for example, the product obtained by condensing phenol with formaldehyde. The products obtained vary with the kind and relative proportions of the reactants, the nature of the catalyst, and the time and temperature of the reaction. They may be classed as thermosetting and thermoplastic resins. The chief points of difference are the solubility in organic solvents, compatibility with other resins and mechanical strength. The resins are often modified by the addition of natural gums and resins, drying and non-drying oils and acids, or by the addition of other synthetic resins.

As herein used, the term "phenol-formaldehyde resin" includes only the pure phenolic resins and is not meant to include those reaction products of a phenol with an aldehyde that are modified by the addition of other substances. The use of modified phenol-aldehyde resins in vinylidene chloride compositions is claimed in a concurrently filed application of E. C. Britton and H. W. Moll, Serial No. 403,018.

According to the present invention, phenol-formaldehyde resins are incorporated with a polymeric vinylidene chloride product to produce a mass which can be molded or extruded to form articles having a waxy "handle" and a high gloss. For example, a phenol-formaldehyde resin may be incorporated with a polymeric vinylidene chloride product to produce a mass that can be molded or extruded at lower temperatures and pressures than can the polymeric vinylidene chloride product alone, and articles prepared from such compositions retain a high tensile strength. In many instances addition of the phenol-formaldehyde resins has a plasticizing effect, particularly at elevated temperatures, and produces a mass that can easily be molded or extruded to form useful articles having a tough durable glossy finish and which retain a resistance to chemicals typical of polymeric vinylidene chloride products. Furthermore, addition of a phenol-formaldehyde resin to a polymeric vinylidene chloride product produces a mass that can easily be extruded to form threads, bands, filaments, foils, and the like which are flexible, have a waxy handle, a glossy finish, and which retain the high tensile strength shown by similar articles prepared from the polymeric vinylidene chloride product alone. In many instances the phenol-formaldehyde resins are not completely compatible at room temperature with the polymeric vinylidene chloride products and produce masses that can be molded or extruded to form articles that are translucent to opaque when cold and which have a durable glossy finish.

The addition of the phenol-formaldehyde resins to the polymeric vinylidene chloride product may be effected by any of several methods. For example, the polymeric vinylidene chloride product and the particular phenol-formaldehyde resin to be employed may be mixed or ground together in a ball mill or other suitable mixer commonly employed in the plastic art, or they may be added to the polymer on hot rolls in a method similar to compounding rubber compositions. Another satisfactory method of incorporating the phenol-formaldehyde resin with the polymeric vinylidene chloride product is to dissolve the resin in a readily volatile solvent and mix or grind the materials in any suitable apparatus such as a ball mill, thereafter evaporating the solvent. To effect complete homogenization of the composition, it should preferably be heated to a fusion temperature.

The following examples illustrate the practice of the invention but are not to be construed as limiting the scope thereof:

Example 1

2.5 grams of Durez 210, a phenol-formaldehyde resin having a melting point of 119°–122° C., and 5.0 grams of 1,2-epoxy-3-(2-phenylphenoxy) propane, to serve as a heat stabilizer, were incorporated in 20 ml. of acetone. To this solution was added 42.5 grams of a co-polymer consisting of 90 per cent vinylidene chloride and 10 per cent vinyl chloride. The mixture was ground until thoroughly blended, and then dried. The composition could easily be molded or extruded and filaments having a diameter of 0.014 inch prepared from this material were flexible threads with a waxy handle and had a tensile strength above 39,000 pounds per square inch.

Example 2

A composition was prepared as in Example 1 but substituting Varcum 250, a phenol-formaldehyde resin having a melting point of 106° to 108° C., for the Durez 210. The manufacturer's 1938 catalog shows this resin to be an unmodified, 100 per cent phenolic resin having a specific gravity of 1.18, acid number of 30-40, color WW-WG, and to be soluble completely in the common lacquer solvents and in varnish oils at the melting point, but incompletely soluble in mineral spirits. The composition could easily be molded or extruded and filaments having a diameter of 0.0115 inch prepared from this material were tough, glossy threads with a waxy handle and had a tensile strength above 51,000 pounds per square inch.

Example 3

2.5 grams of Lewisol 400, a phenol-formaldehyde resin having a melting point of 122° to 123° C., and 5.0 grams of tributyl aconitate, to serve as a heat stabilizer, were incorporated with 20 ml. of acetone. To this solution was added 42.5 grams of a co-polymer consisting of 90 per cent vinylidene chloride and 10 per cent vinyl chloride. The mixture was ground until thoroughly blended, and then dried. The composition could easily be molded or extruded and filaments having a diameter of 0.014 inch prepared from this material were translucent, tough threads with a waxy handle and had a tensile strength above 35,000 pounds per square inch.

Example 4

A composition was prepared as in Example 1, but substituting Amberol ST-137, a phenol-formaldehyde resin having a melting point of 120° to 122° C., for the Durez 210. The composition could easily be molded or extruded and filaments having a diameter of 0.016 inch prepared from this material were translucent, flexible threads with a glossy finish and had a tensile strength above 39,000 pounds per square inch.

Example 5

A composition was prepared as in Example 1 but substituting Varcum 810, a phenol-formaldehyde resin having a melting point of 116° to 118° C., for the Durez 210. The composition could easily be molded or extruded and filaments having a diameter of 0.015 inch prepared from this material were opaque, flexible, glossy threads and had a tensile strength above 42,000 pounds per square inch.

Example 6

A composition was prepared as in Example 3 but substituting Super Beckacite 3000, a phenol-formaldehyde resin having a melting point of 133° to 141° C., for the Lewisol 400. The composition could easily be molded or extruded and filaments having a diameter of 0.017 inch prepared from this material were opaque, flexible threads and had a tensile strength above 28,000 pounds per square inch.

Example 7

4.5 grams of Amberol ST-137, a phenol-formaldehyde resin having a melting point of 120°–122° C., and 0.5 gram of a co-polymer consisting of 90 per cent vinylidene chloride and 10 per cent vinyl chloride were heated to a fusion temperature. The product was a homogeneous brown colored tough tacky solid.

Example 8

5 parts by weight of Bakelite XR-3180, a phenol-formaldehyde resin having a melting point below 47° C., and 2 parts by weight of di-(alpha-phenylethyl) ether, to serve as a heat stabilizer, were incorporated with 10 parts of acetone. To this solution was added 93 parts by weight of a co-polymer consisting of 90 per cent vinylidene chloride and 10 per cent vinyl chloride. The mixture was ground until thoroughly blended and then dried. The composition could easily be molded or extruded and filaments having a diameter of 0.028 inch prepared from this material were flexible glossy threads and had a tensile strength above 32,000 pounds per square inch.

Example 9

A phenol-formaldehyde resin was prepared by heating a mixture consisting of 175 grams of a 37 per cent by weight solution of formaldehyde in water, 140 grams of phenol and 4.7 grams of sodium hydroxide, to serve as a catalyst, at a temperature of 79° C. for 6 hours while being continuously stirred. The reaction mixture was partially dehydrated by heating at a temperature of 40° C. and under a pressure of 12 millimeters of mercury to obtain a final product which had a specific gravity between 1.20 and 1.23 at 25°/25° C. 8 parts by weight of this product and 16 parts by weight of di-(alpha-phenylethyl) ether were dissolved in 92 parts of ethyl alcohol. To 1 part by weight of this solution were added 4 parts by weight of a co-polymer consisting of 90 per cent vinylidene chloride and 10 per cent vinyl chloride. The mixture was ground until thoroughly blended and then dried. The composition could easily be molded or extruded and filaments having a diameter of 0.020 inch prepared from this material were tough flexible threads and had a tensile strength above 44,000 pounds per square inch. Heat treating the filaments in air at 65° C. for 7 days greatly increased the stiffness as compared to filaments of like diameter prepared from compositions which did not contain the phenol-formaldehyde resin. These stiff filaments may be advantageously used as bristles.

The compositions which contain relatively low proportions of the phenol-formaldehyde resins have improved molding and extruding properties while the compositions which contain relatively large proportions of the resins are tough tacky solids. The latter compositions may be advantageously used in preparing improved lacquers, varnishes, or paints.

The proportion of phenol-formaldehyde resin to be employed in the new compositions depends upon the hardness, toughness, strength and flexibility desired in the modified composition. For example, compositions for use in injection molding must flow well at molding temperatures but should harden rapidly at lower temperatures. They should be hard enough when cold to withstand scratching and tough enough to withstand shock. Compositions for use in making thin films, foils, or filaments should have high flexibility at all temperatures met with in service and be sufficiently hard and tough to withstand abrasion. Similarly, lacquer coatings must be hard, tough and possess good adherence and flexibility. The exact proportion of modifying agent to be employed in preparing the new compositions will depend on the use requirements. In general from about 0.5 to about 90 per cent of the phenol-formaldehyde resin may be employed, based on the weight of the polymeric vinylidene chloride product with which they are incorporated. When it is desired simply to produce a product having improved molding and extruding properties and which can be worked to form useful articles, threads, bands, filaments, foils, and the like which retain the high tensile strength shown by the parent polymeric vinylidene chloride product, the amount of phenol-formaldehyde resin will ordinarily vary from about 0.5 to about 40 per cent, and more specifically, from about 2 to 7.5 per cent. When, however, it is desired to produce a polymeric vinylidene chloride product which is substantially more compatible with many of the commonly used lacquer solvents, the amount of phenol-formaldehyde resin employed may vary from about 10 to about 90 per cent.

While the above examples show the preparation of compositions from a polymeric vinylidene chloride product consisting of a co-polymer of 90 per cent vinylidene chloride and 10 per cent vinyl chloride, incorporated with phenol-formaldehyde resins, other polymeric vinylidene chloride products which have wide commercial value and which may be advantageously used in preparing the new compositions, include the co-polymers containing from about 5 to about 30 per cent of vinyl chloride and correspondingly from about 95 to about 70 per cent of vinylidene chloride. Other co-polymers, in like proportions with vinylidene chloride, as included herein under the definition of the term "polymeric vinylidene chloride product" form equally valuable compositions.

In preparing molded or extruded articles from the new polymeric vinylidene chloride compositions at temperatures above their respective softening points, where the material is often maintained for a considerable period of time, it is desirable to have present in the composition a heat-stabilizing agent which acts to decrease or prevent thermal decomposition. A substance which will also prevent darkening on exposure to light is often desirable. Compounds applicable for these purposes include 1,2-epoxy-3-(2-phenylphenoxy) propane, allyl-disulfide, 2-chloroallyl-disulfide, 2,2'-dihydroxybenzophenone, tributyl aconitate, dipropyl maleate, 2-phenoxyethyl cinnamate, and di-(alpha-phenylethyl) ether.

The incorporation of minor amounts of coloring agents, fillers, plasticizers and the like has also been found to be useful and desirable when used in such amounts that the desirable mechanical properties of the product are not affected.

Other modes of applying the principle of my invention may be employed instead of those explained, change being made as regards the materials employed, provided the product recited in the following claims be obtained.

I therefore point out and distinctly claim as my invention:

1. A thermoplastic composition, the essential ingredients of which are a vinylidene chloride polymer in which the vinylidene chloride constitutes at least 70 per cent of the polymer, and from about 2 to about 7.5 per cent, based on the weight of the polymer, of an unmodified phenol-formaldehyde resin having a melting point near 106° C., a specific gravity of about 1.18, and an acid number in the range 30–40, which resin is soluble in the common lacquer solvents, but incompletely soluble in mineral spirits.

2. The composition claimed in claim 1, wherein the polymeric vinylidene chloride product is a co-polymer of about 90 per cent vinylidene chloride and about 10 per cent vinyl chloride.

LORNE A. MATHESON.